UNITED STATES PATENT OFFICE.

CHARLES QUARTLEY, OF BALTIMORE, MARYLAND.

IMPROVEMENT IN THE MANUFACTURE OF TRANSPARENT PICTURES OR SIGNS.

Specification forming part of Letters Patent No. 217,404, dated July 8, 1879; application filed November 6, 1877.

*To all whom it may concern:*

Be it known that I, CHARLES QUARTLEY, of the city of Baltimore and State of Maryland, have invented certain new and useful Improvements in Ornamenting Glass and other Substances; and I do hereby declare that the following is a full, clear, and exact description of the invention, which will enable others skilled in the art to which it appertains to make and use the same.

This invention relates to the manufacture of transparent pictures or signs; and it consists in coating plates of glass or other transparent materials with the well-known bichromate gelatine solution or its analogues, next exposing under a suitable negative, and then developing the design by washing away the portions of the coating unaffected by light, and coloring with liquid colors, in the manner hereinafter explained.

In carrying out my process, I make a tracing of any suitable design in india-ink, or other suitable pigment, on sheet-gelatine, or the most transparent paper I can obtain, being careful to have every line opaque, which tracing serves as the positive, from which I proceed to make a negative by the following process:

Having thoroughly cleaned a plate of glass the size of my drawing and dried it, I give it a coat of dissolved gelatine of the proportion of one ounce to eight of water. When dry I steep this plate (in a dark room) in a solution of bichromate of potash, (two ounces of saturated solution to one quart of water,) and then rack till dry; or I take one ounce of gelatine dissolved in eight ounces of water, to which I add a half of a fluid ounce of a saturated solution of bichromate of potash, and coat the plate at once and dry. I now place my paper positive on a clear glass in an ordinary photograph-printing frame, and place the sensitized plate face down upon that, and, reversing the frame, expose the plate to the action of the sun's rays for ten seconds. I then remove it (in the dark room) and immerse it in water at a temperature of 90° Fahrenheit until all the unaffected portion of the gelatine is dissolved off. After thoroughly washing I dry and flow it with tincture of iodine, which will adhere only to the design on the glass, and on washing will leave the pattern in transparent lines on a deep-orange ground.

I have found, however, that the tincture of iodine has a tendency to evaporate in course of time, and to prevent this after it is dried I immerse the plate in an ordinary nitrate-of-silver bath, expose to light, develop with iron, and reintensify with sulphuret of potash. I can use other materials equally as well as the tincture of iodine; but this has greater intensity. An aniline color called "Bismarck brown" can also be used with nearly the same results.

When a reduced or enlarged subject is required I simply make a photographic negative of the original drawing, making it as intense as possible, under which I expose the sensitized plates, and color it the same as above, using solutions of aniline colors instead of the tincture of iodine, and omitting the subsequent treatment with the nitrate of silver, &c. I now take a plate thus produced for my negative proper, from which I make any number of plates similar to my original design in transparent colors on any substance that will receive a coat of gelatine by coating such substances with the gelatine bichromate solution, exposing, washing, and drying, as before described in the process of making negatives.

Having sensitized, exposed, washed, and dried a sufficient number of duplicates, I immerse them, one at a time, in solutions of different aniline or other suitable colors; or I variegate them by dipping a plate two-thirds down in one color, and then turning it upside down dip it again two-thirds in another color, which will leave the center one color and either end a different one; or they may be sprinkled with different colors, and so obtain a mottled or striped appearance; or liquid color may be applied with a brush. After coloring I rinse the plates off; then flow with strong alum-water, and, when dry, they may be varnished, if desired.

This process shows the plan usually followed by me when making transparent signs with only a single coating of gelatine; but I also propose to make pictures with a variety of colors by coating the plate and exposing it under negatives as many times as I dip the plate in different colors. In one way of carrying out this portion of my invention I make two negatives, one the reverse of the other, or having the design in one transparent, and the ground in the other. I then use one negative, as above described, for producing a single-colored transparency, and after dipping in one color and drying coat with the bichromate gelatine solution a second time, expose under the second or reverse negative, and dip in another color. By this process a transparent sign or ornamental plate may be made.

drying, and dipping in dissimilar colors, and then uniting them, coated faces inward, with Canada balsam, transparent varnish, or other similar material.

If preferred, the balsam or varnish may be dispensed with, and the plates held together by a frame or binding.

If the plate is not to be used in the manner of a transparency a printed ornamental backing may be applied, or a coating of paint of any desired opaque color; or the appearance